N. J. Glover,
Spoke Lathe.
No. 20,344.  Patented May 25, 1858.
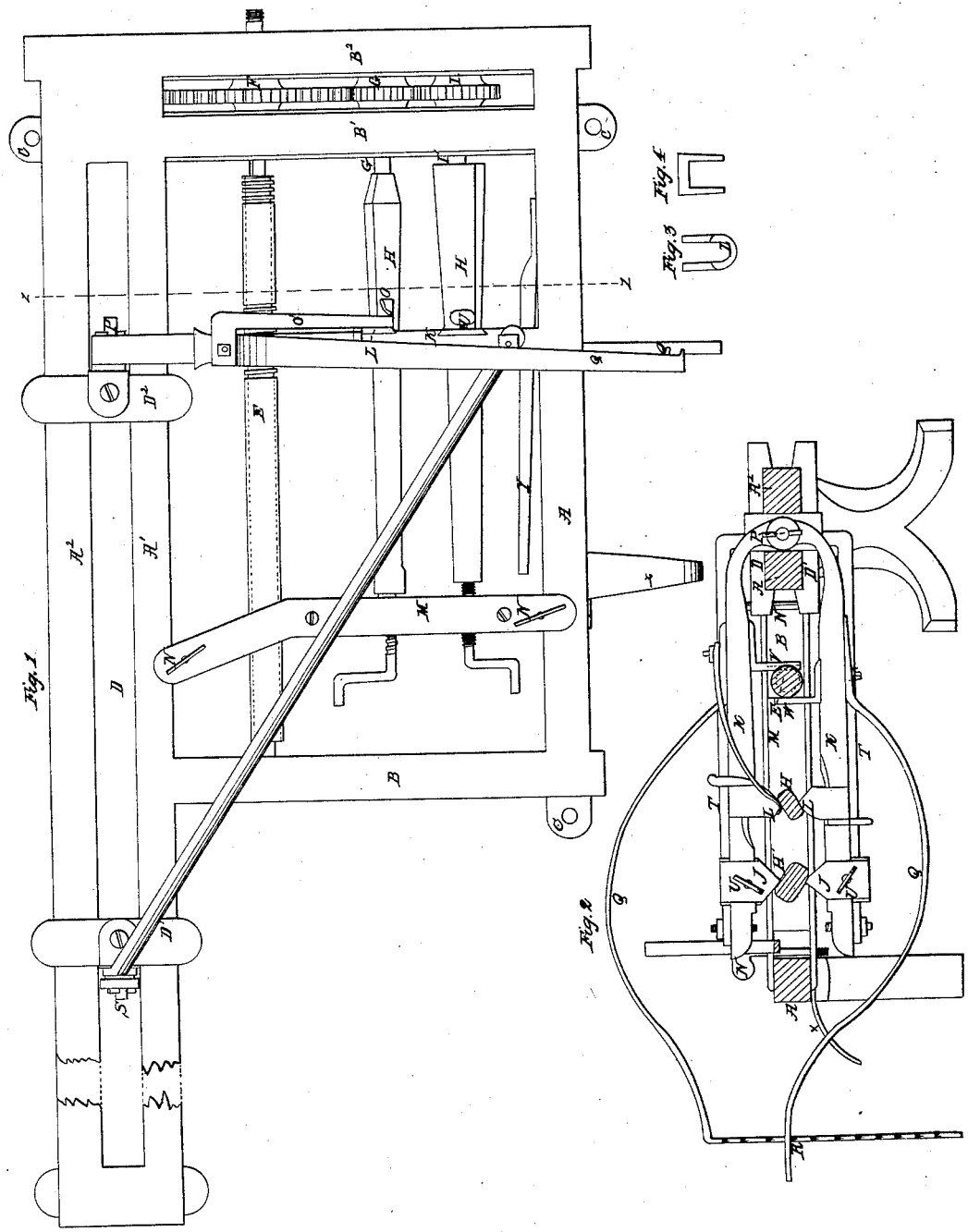

UNITED STATES PATENT OFFICE.

N. J. GLOVER, OF WAVELAND, INDIANA.

MACHINE FOR TURNING IRREGULAR FORMS.

Specification of Letters Patent No. 20,344, dated May 25, 1858.

*To all whom it may concern:*

Be it known that I, NEWTON J. GLOVER, of Waveland, in the county of Montgomery and State of Indiana, have invented certain new and useful Improvements in Machines for Turning Irregular Forms; and I do hereby declare that the same are described and represented in the following specifications and drawings.

To enable other skilled in the art to make and use my improvements I will proceed to describe their construction and operation, referring to the drawings, in which the same letters indicate like parts in each of the figures.

Figure 1, is a plan of a machine with my improvements. Fig. 2, is a sectional elevation on the line $z, z$, of Fig. 1.

The nature of my improvements in machines for turning irregular forms, consists in arranging two traversing and vibrating cutters, to work on the opposite sides of the same piece of wood, which is turned between them, and cut into the form of the pattern or model, which vibrates the cutters; also in the arrangement of certain devices by means of which the cutters are brought into action and connected to the traverse motion, or thrown out of action and disconnected from the traverse motion, at the same time.

In the accompanying drawings A, A', are the sides, and B, B', the ends, of an oblong rectangular frame, supported by the legs C, C, C, at a proper height to be operated conveniently. The sides A, A', extend beyond the bar B', at the right hand end to support the bar B², and the side A', extends beyond the end B, at the left hand end of the frame, and it has the bar A² arranged parallel to it, as shown in the drawing, to form ways for the carriage D, to traverse on. This carriage consists of the bar D, and the two end pieces D', D², which project over the bars A', A², as shown in section Fig. 2, and are fitted to traverse freely on said bars as the machine is operated.

E, is the screw which traverses the carriage and cutters. It is fitted to turn in the ends B, B', B², and projects beyond the latter as shown in the drawing, to receive a crank, pulley or gear to operate the machine. The screw E, has the gear F fastened to it between the bars B', and B², to turn the gear G, and spindle G', which rotates the wood or blank H, which is to be turned. The gear G, turns the gear I, and spindle I', which rotates the pattern H', between the points J, J, on the cutter bars K, K, to vibrate them to operate the cutters L, L, which act on the blank H, and cut it into the form of the pattern, the gears G, and I, having each the same number of teeth, and the ends of the blank H, and pattern H' being arranged to turn on pivots in the carriage M, as shown in the drawing, which carriage is made of two plates of metal, with a piece of wood between them, and their ends are drawn tight to the sides A, A', by the screws N, N, to hold the carriage M, in the position desired.

There is a pivot P, fastened to the end of the carriage D, to which the cutter bars K, are fitted so as to vibrate freely when moved by the pattern H', acting on the points J, J, the cutter bars being pressed toward each other and the points to the pattern, by the springs Q, Q, fastened to the cutter bars for that purpose, and made to project over in front of the machine where they are connected by the tooth-rack R, as shown in Fig. 2.

The pivot S, is fastened to the opposite end of the carriage D, from the pivot P, and the brace rods T, T, are fitted to vibrate freely on the pivot S, and their opposite ends are fastened to the cutter bars K, K, to brace them, and hold them at a right angle to the carriage D, when they are traversed with it.

The points J, J, are fitted to dovetailing scores in the cutter bars, and provided with set screws U, U, to fasten them in the desired position, and the cutters L, L, are made in the form shown in Fig. 3, and fitted to scores in the cutter bars, and fastened by wedges one of which is shown in Fig. 4. The nut or rack of teeth V, is fastened to the cutter bar K, so as to be acted upon by the screw E, to traverse the cutter bar and carriage, and the stand W, is fastened to the lower cutter bar K, to hold the screw against the rack V. This stand W, may have a rack of teeth upon it fit the screw E if preferred that way.

The machine having been constructed as above described and a piece of wood or blank H, put in, and the cutters brought to act on it at the right hand or large end by hitching the rack R, onto the lower spring Q, and turning the screw, so as to traverse the cutters and rotate the blank H, and pattern H', which vibrates the cutters while the blank is rotated between them, and turned into the form of the pattern; and when the cutters get to the small end of the blank the stop X, on the side A, throws the lower spring Q, out of the rack R, so that the lower cutter falls from the blank turned; while the upper cutter is thrown up by the spring Y, and the rack V, released from the screw E. The blank turned may be removed and another put in its place and the carriage pushed back to the right hand end of the machine, when the cutter bars are brought to the pattern and the lower spring Q, hitched into the rack V, when the machine may be again set in motion as heretofore described. The springs Q, Q, yield as the cutter bars are vibrated by the pattern when the machine is operated.

The spring smoothing cutter O, is made in the form shown in the drawing, on the end of the spring O', which is fastened to the upper cutter bar K, so as to vibrate and traverse with it, and follow the shaping cut L, and smooth the article turned, by taking off a small chip or shaving, with a sharp, keen edge.

I find by using two cutters at the same time on opposite sides of the blank I can turn a small stick and turn it well; that is, a much smaller stick than I could turn with one cutter. For when two cutters are used the pressure of one counteracts the other and prevents the stick from being sprung or bent in the process of turning.

I believe I have described and represented the improvements in machines for turning irregular forms which I have invented, so as to enable any person skilled in the art to make and use them.

I will now state what I desire to secure by Letters Patent—

1. I claim two traversing and vibrating cutters arranged to work on the opposite sides of the piece of wood turned, in the way and manner described.

2. I claim arranging the nuts or racks of teeth (upon which the screw E acts to traverse the cutters) upon the cutter bars in such a way and manner, that when the cutters are brought into action the racks will be brought to the screw, so as to traverse the cutters, and when the cutters are thrown out of action, the racks which traverse them are released from the screw as described.

N. J. GLOVER.

Witnesses:
I. DENNIS, Jr.,
J. F. CALLAN.